B. A. GODEK & I. BENJAMIN.
ELASTIC TIRE OF INDIA RUBBER OR OTHER SIMILAR MATERIAL WITH INNER HOLLOW.
APPLICATION FILED OCT. 30, 1912.

1,197,118. Patented Sept. 5, 1916.

UNITED STATES PATENT OFFICE.

BOLESLAS ANDRÉ GODEK AND ISAAC BENJAMIN, OF PARIS, FRANCE.

ELASTIC TIRE OF INDIA-RUBBER OR OTHER SIMILAR MATERIAL WITH INNER HOLLOW.

1,197,118. Specification of Letters Patent. Patented Sept. 5, 1916.

Application filed October 30, 1912. Serial No. 728,752.

*To all whom it may concern:*

Be it known that we, BOLESLAS ANDRÉ GODEK, a subject of the Czar of Russia, and ISAAC BENJAMIN, a citizen of the United States of America, both residing at Paris, France, have invented certain new and useful Improvements in Elastic Tires of India-Rubber or other Similar Material with Inner Hollow, of which the following is a specification.

This invention relates to elastic tires of india-rubber or other similar material with an inner hollow. It is characterized by the combination of an elastic ring of india-rubber of special shape having an inner hollow with a double rim comprising a steel ring which prevents absolutely any reduction of the width of the inner hollow under the effect of the crushing so that the relations of dimensions between the different parts of the tire remain the same even when the tire is being deformed and so that, further, the elasticity of the tire is maintained constant.

There exist already a great number of hollow tires presenting certain apparent analogies with the tire which forms the object of the present invention. This invention, therefore, does not concern the principle itself of such a tire but the exact relations which exist between its inner and outer forms and the intimate combination of the elastic part proper with the double metal rim; these relations and combinations being indispensable for the realization of the result.

Figure 1:
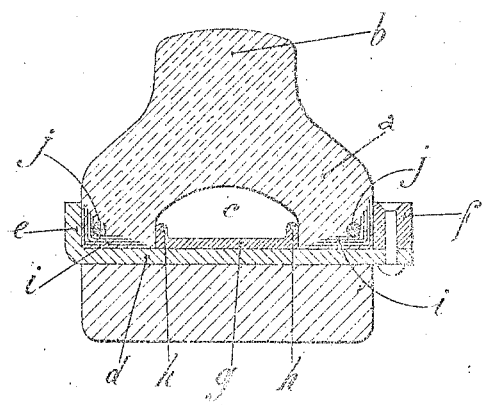
Figure 2:
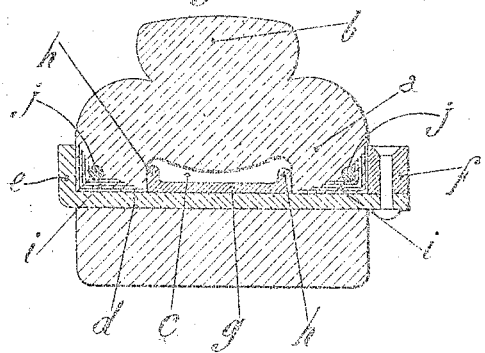

A tire, constructed according to the improvements which form the object of this invention, is shown, by way of example, in the accompanying drawings in which:

Figure 1 is a cross section of the tire shown at the normal state, that is to say, not loaded. Fig. 2 is a similar section of the same tire loaded.

According to this invention the tire essentially comprises an elastic ring $a$ of india rubber or other similar material the cross section of which is like an arc of very great thickness surmounted by an extension $b$ arranged upon the central part of the arc and serving as tread. This cross section of the elastic ring is characterized by the fact that the tread, the sides of which are approximately vertical, is of approximately the same width as the inner hollow $c$ which, in consequence of the described shape of the tire, is formed between the two shoulders of the elastic ring. This shape permits of obtaining a large surface of contact between the elastic ring and the metal rim and it permits further to realize, besides the qualities of flexibility inherent to the described shape, a greater resistance and an almost absolute constance of the said qualities of flexibility until the almost complete wear of the tread. The elastic ring $a$—$b$ is intimately combined with a double metal rim upon which it is mounted. This double rim comprises a steel ring $d$ with a flange $e$ at one edge against which bears the corresponding shoulder of the elastic ring. The metal rim $d$ is open at the other edge in order to permit the insertion of the elastic ring $a$, whereupon a ring $f$ is riveted upon the free edge of the rim $d$ for maintaining the other shoulder of the elastic ring. Upon the metal rim $d$ a steel ring $g$ is mounted which is of the same width as the inner hollow $c$ into which it fits exactly. This steel ring $g$ has two lateral parts $h$ rounded off at the top which bear against the inner side walls of the hollow $c$ of the elastic ring and serve for maintaining constant the width of this hollow whatever deformation the tire may undergo. Canvas layers $i$ are embedded in the shoulders of the elastic ring at the outer edges and said elastic ring is fixed upon the metal rim in the well known manner by means of wires $j$—$j$ and by means of said canvas layers. The wires $j$ are arranged each as close as possible to the outer corner of the corresponding shoulder and in order to obtain a better distribution of the strain, the canvas layers are of such lengths that their ends form steps. The constant elasticity of such a tire results from the special shape of its ring of india rubber and from the exact relation of width existing between the inner hollow and the tread which surrounds the same. This relation having to subsist with any deformations of the tire, even when the same is completely crushed (Fig. 2), it is indispensable that the width of the said hollow $c$ never be reduced as otherwise the elasticity of the tire would be reduced. The steel ring $g$ is therefore intimately connected with the tire and forms an integral part of the same as it maintains constant the said width. This steel ring $g$ further serves for preventing the crushing of the shoulder to produce a collapsing of the india rubber into the hollow, to avoid the getting loose of the canvas layers $i$, as the caoutchouc, owing to its elastic properties, does work only at the parts which are situated above the base of the shoulders maintained by the flanges of the two parts of the double rim.

It has to be remarked that tires have become already known having a metal ring arranged in a hollow of the india rubber ring, but with all the tires of this type, this metal ring serves always, also in a varying degree, as a device for fixing the elastic ring. According to this invention however this elastic ring is fixed merely by means of the wires $j—j$ and the steel ring $g$ serves exclusively for maintaining the hollow $c$ at a constant width, which is one of the essential conditions for the realization of this invention.

The characteristic feature of this invention is the use of a ring of india rubber the cross section of which is of a special profile and such that the relation of width between the tread and the inner hollow rests invariable with any periods of crushing, as shown in Fig. 2 of the drawing, said ring of india rubber being combined, for this purpose, with a double metal rim which maintains the shoulders from inside and outside and prevents the reduction in width of the hollow as well as the lateral deformation of the india rubber at the base of said shoulders.

We claim:—

An india rubber tire of a cross section in the shape of an arc surmounted by a projection which forms the tread characterized by a metal rim in the cavity of said tire which is ⌴ shaped and of a width equal to that of the projection which forms the tread and against the sides of which the inner edges of said tire bear, said metal rim being independent of the felly on which the tire is mounted, substantially as described and shown and for the purpose set forth.

In witness whereof we have hereunto set our hands.

BOLESLAS ANDRÉ GODEK.
ISAAC BENJAMIN.